Nov. 27, 1934.   L. K. SNELL   1,982,360
BRAKE
Filed Oct. 19, 1929   3 Sheets-Sheet 1
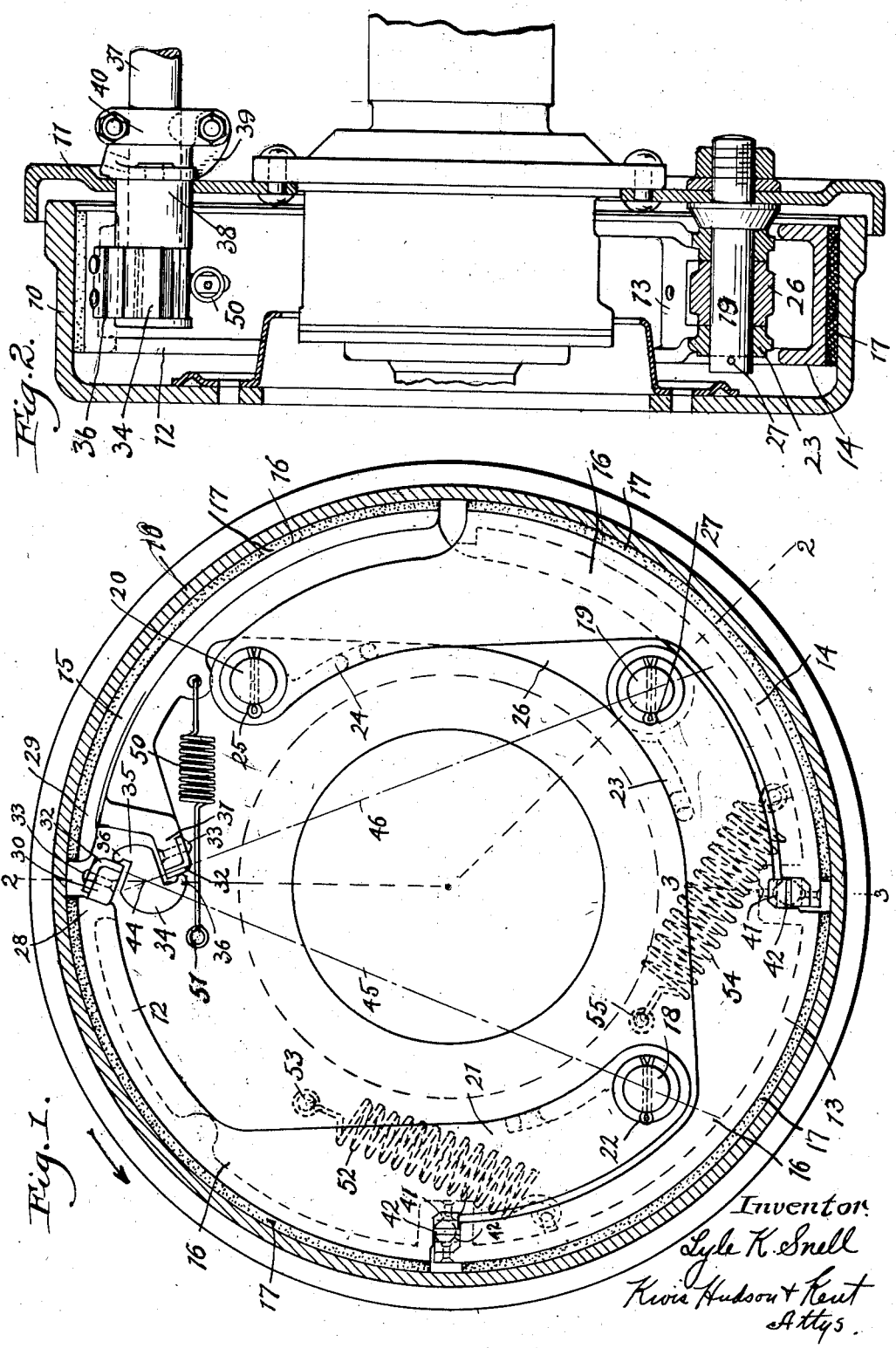
Inventor
Lyle K. Snell
Kwis Hudson & Kent
Attys.

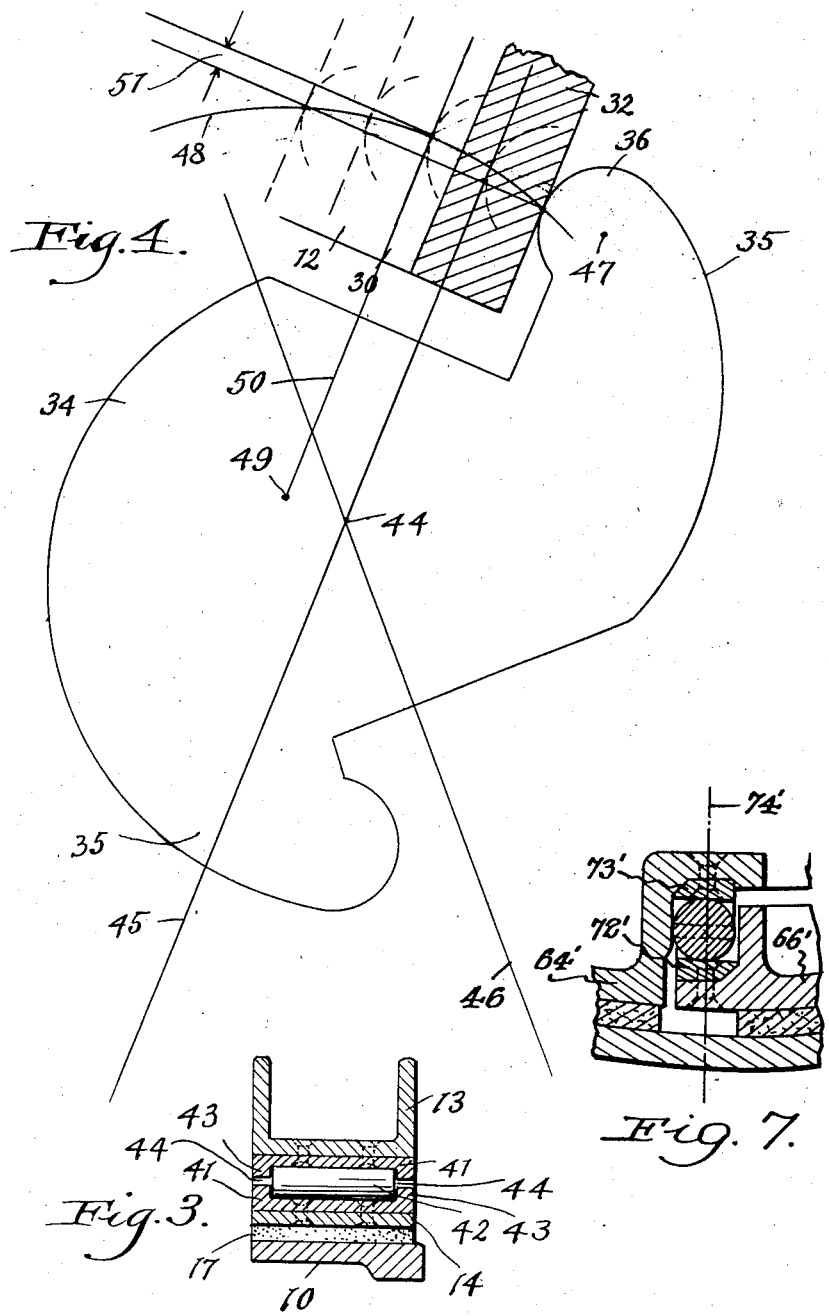

Nov. 27, 1934.   L. K. SNELL   1,982,360
BRAKE
Filed Oct. 19, 1929   3 Sheets-Sheet 3
Fig. 5.
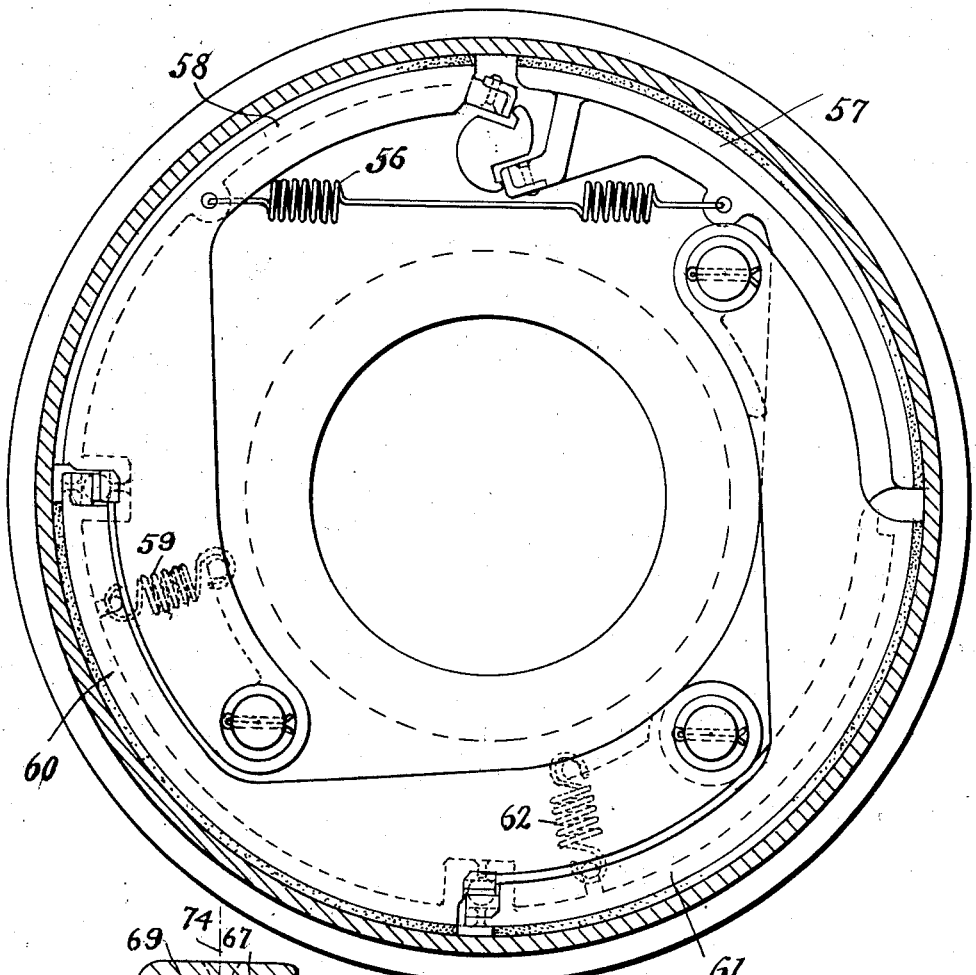
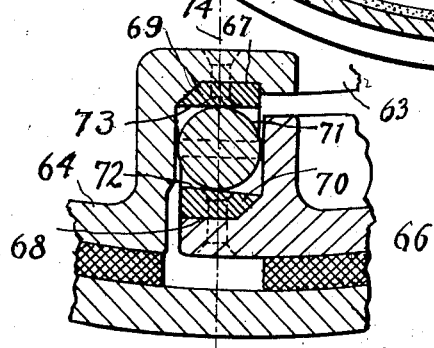
Fig. 6.
Inventor
Lyle K. Snell.
Knox Hudson & Kent
attys.

Patented Nov. 27, 1934

1,982,360

UNITED STATES PATENT OFFICE 1,982,360

BRAKE

Lyle K. Snell, Detroit, Mich., assignor to Eaton Manufacturing Company, Cleveland, Ohio, a corporation of Ohio Application October 19, 1929, Serial No. 400,776

14 Claims. (Cl. 188—78)

This invention relates to brakes for vehicles and the like, and more particularly to a brake of the multiple shoe internal expanding type.

An object of this invention is to provide a brake of the multiple shoe type in which braking force applied to one pivoted shoe is transmitted to an adjacent pivoted shoe.

Another object of this invention is to provide an improved form of brake of the multiple shoe type, in which frictional losses between moving parts are reduced to a minimum.

Another object of this invention is to provide a multiple shoe brake in which all of the shoes are simultaneously moved into operative engagement with the brake drum.

A further object of this invention is to provide a multiple shoe brake having means for compensating for the distortion of the shoes caused by an application of braking force.

Other objects and advantages of this invention will be apparent in the following description taken in conjunction with the drawings, in which Fig. 1 is a sectional elevation illustrating a multiple shoe brake embodying my invention.

Fig. 2 is a sectional elevation taken on line 2—2 of Fig. 1.

Fig. 3 is a section taken on line 3—3 of Fig. 1.

Fig. 4 is a diagrammatic view illustrating the manner in which braking force is applied to one of the shoes by the actuating member.

Fig. 5 is a sectional elevation illustrating another arrangement for the retracting springs employed with the brake of my invention.

Fig. 6 is a sectional view on an enlarged scale showing another arrangement of parts for transmitting braking force from one shoe to an adjacent shoe.

Fig. 7 is a partial sectional view showing other means for pressing a friction member against the drum.

Referring now to the drawings for a detailed description of my invention, I show a brake drum 10, in which the mechanism of my multiple shoe internal expanding brake is housed. This mechanism is supported upon a suitable backing plate or anchor plate 11, which is rigidly supported adjacent the brake drum in any suitable manner, and includes a plurality of brake shoes 12, 13, 14 and 15. Each of these shoes is provided with a curved outer surface 16, upon which is secured a suitable brake lining 17 adapted to frictionally engage the inner surface of the brake drum when braking force is applied to the shoes. For operatively securing or anchoring the shoes to the backing plate 11, I provide this plate with pivot pins or anchor pins 18, 19 and 20, upon which the brake shoes are pivotally mounted. The brake shoe 12 is formed with an arm 21 which is pivotally mounted upon the anchor pin 18 and retained thereon by any suitable means, such as a key 22 passing through the anchor pin. This shoe 13 is formed with a forked arm 23, which is pivotally mounted upon the anchor pin 19. The shoe 14 is formed with an arm 24, which is provided with an opening therethrough, and is pivotally mounted upon the anchor pin 20 and retained thereon by means of the key 25, which passes through the anchor pin. The shoe 15 is formed with an arm 26 which passes through the opening of the arm 24, and is pivotally mounted upon the anchor pin 19 between the arms of the forked arm 23 of the shoe 13. The arms 23 and 26 may be retained on the anchor pin 19 by means of the key 27 which passes through the anchor pin.

The shoes 12 and 15 when assembled in place have their free ends 28 and 29, respectively, in opposed relation. These ends 28 and 29 are provided with extensions 30 and 31, respectively which serve as portions to be engaged for applying braking force to the shoes. These extensions may be of any suitable form, and in this instance they are provided with hardened L-shaped bearing portions 32, which are secured to the extensions by means of the rivets 33. Obviously, these L-shaped bearing portions may be omitted if desired.

For applying braking force to the shoes I provide an actuating member 34, which is arranged between the extensions 30 and 31, carried respectively, by the opposed ends of the brake shoes 12 and 15. This actuating member is adapted to be rotated about its axis and is provided with arms 35, which have their outer ends rounded to form cam portions 36, for engagement with the bearing portions 32 upon rotation of the actuating member, to cause the opposed ends of the shoes 12 and 15 to be spread apart so that these shoes are swung about their respective anchor pins and the brake linings carried by these shoes frictionally engage the brake drum.

The actuating member 34 is secured to a rotatable actuating shaft 37 which is journaled in a suitable bearing 38. In this instance the bearing 38 is secured to the braking or anchor plate and extends through this plate into the brake drum. This bearing is preferably provided with an integral arm 39, which is adapted to be engaged by a suitable stop 40, secured to the shaft 37, for limiting the rotation of this shaft in the direction to release the brake.

A part of the braking force which is applied to the shoe 12 by the actuating member is transmitted to the shoes 13 and 14 to cause these shoes to be swung about their respective anchor pins 19 and 20, into frictional engagement with the brake drum. For the purpose of transmitting braking force from shoe 12 to shoe 13, I arrange these shoes so that a portion of the latter shoe overlaps the arm 21 of shoe 12. These overlapping portions are formed with bearing surfaces which are in opposed relation when the shoes are assembled, and which in this instance, are provided with hardened bearing members 41, between which is disposed a roller 42. These bearing members are preferably provided with end flanges 43 which engage the end faces 44 of the roller for the purpose of retaining it in proper position.

For the purpose of transmitting braking force from the shoe 13 to the shoe 14 these shoes are, likewise, arranged so that a portion of the shoe 14 overlaps the arm 23 of the shoe 13. These overlapping portions are formed with surfaces in opposed relation which are also provided with bearing portions 41 having a roller 42 retained therebetween in the manner already described.

When braking force is applied to the shoe 12 by the actuating member 34 this shoe is swung outwardly about the anchor pin 18. The outward movement of the shoe transmits motion through the opposed bearing portions 41 and the roller 42 to the shoe 13, causing this shoe to be swung outwardly about its anchor pin 19. This outward movement of the shoe 13 transmits motion to the shoe 14 in a like manner, causing this shoe to be swung outwardly about its anchor pin 20. In other words, an application of braking force to the shoe 12 causes braking force to be transmitted from this shoe to the shoe 13, and, in turn, from the shoe 13 to the shoe 14. By providing the overlapping portions of the shoes with opposed bearing surfaces having rollers 42 therebetween, the braking force is transmitted from one shoe to the adjacent shoe with a minimum frictional loss.

With the vehicle traveling ahead the drum 10 rotates in the direction indicated by the arrow shown in Fig. 1, and when the actuating cam 34 presses the shoe 12 against the moving drum, there is a tendency for the drum to carry the shoe along with it. This tendency causes the shoe to be wedged or pressed more tightly against the drum by what is known in the art as a self-energizing action. The outward movement of the shoe 12 against the drum, causes an increment of braking force to be transmitted to the shoe 13. Likewise a portion of the force which presses shoe 13 against the moving drum is due to the self-energization of this shoe, and the outward movement of this shoe causes an increment of braking force to be transmitted to the shoe 14.

For the purpose of reducing friction and wear between the actuating member and the bearing portions of the shoes 12 and 15, I select a zone of action for these cooperating parts where a minimum sliding motion will occur between the cam portions 36 and the bearing portions 32, that is to say, I arrange these parts so that rotation of the actuating member 34 causes the cam portions to engage the bearing portions 32 by a substantially rolling contact.

To achieve this substantial rolling contact between the cam portions and the bearing portions, I arrange the parts as diagrammatically shown in Fig. 4, that is, with the center 44 or axis of the actuating member 34, at the point of intersection of the chords or lines 45 and 46. The line 45, it will be seen, passes through the center of the anchor pin 18 and through the extension 30, adjacent the surface which is engaged by one of the cam portions 36. The line 46 passes through the center of anchor pin 19 and through the extension 31, adjacent the surface which is engaged by the other cam portion 36. For the purpose of simplifying the description I will refer only to the actuation of shoe 12, as illustrated diagrammatically in Fig. 4. When the actuating member 34 is rotated in a counter-clockwise direction about its axis 44, the cam portion 36 contacts with the bearing portion 32 and imparts movements to the shoe 12. This shoe swings about its anchor pin 18, with all points on the bearing portion 32 moving in a circumferential path about the center of the anchor pin 18, and during the rotation of the actuating member, the cam portion 36 moves in a circumferential path about the axis 44.

The cam portion 36 is constructed as an arc of a circle having a center at 47, and as the actuating member rotates about its axis, with the cam portion tangent to or in contact with the bearing portion 32, the points of contact between these parts will lie on an arc 48 having its center at 49. With this arrangement of parts the minimum sliding between cam portion and bearing portion is attained during the actuation of the brake when the adjustment and movement of the parts is such that the zone of contact between the cam portion and the bearing surface, represented by the arc 48, is approximately bisected by the line 50. Thus it will be apparent that the location for this zone of action is selected where the minimum sliding action takes place, that is to say, extending approximately equal distances on both sides of the line 50, which passes through center 49, parallel with line 45, and is spaced from line 45 a distance approximately equal to the radius of the cam portion 36. In Fig. 4 the actuating member is shown in full lines in fully released position for a brake having new lining, and the dotted arc at the extreme left indicates the position to which the actuating member moves when the brake is fully applied and with the lining nearly worn out. I have illustrated at 51 the small amount of sliding action which takes place when the parts move between these extreme limits. Obviously then, during normal operation of the brake, the zone of action between the cam portion 36 and bearing portion 32, must lie between these extreme limits, and in fact, this zone is only a small proportion of the total zone of action and lies somewhere along arc 48, its exact location depending upon the condition of the brake lining.

In brakes of the type, which I have disclosed, it is desirable to have the shoes return automatically to the released position after an application of braking force, and for this purpose any suitable arrangement of springs may be used. For example, as shown in Fig. 1, a spring 50 may be connected to the free end of shoe 15 and to the fixed pin 51 carried by the backing plate 11 for urging this shoe to the released position. Similarly, a spring 52 may be connected adjacent the free end of shoe 13 and to a pin 53 carried by the backing plate 11, and a spring 54 may be connected adjacent the free end of shoe 14 and to a pin 55 carried by plate 11, so that when no braking force is applied to the shoes by the actuating member, shoes 13, 14 and 15 will be retracted by the springs attached thereto, and the movement of shoe 13 to retracted position will cause shoe 12 to be moved to released position also. Obviously, if the spring 52 be omitted for any purpose, or be broken during use, the shoes 13 and 12 can still be released because the movement of shoe 14 to the released position under the influence of spring 54 will cause shoes 13 and 12 to be moved to released position also.

The brake illustrated in Fig. 5 of the drawings differs from the brake shown in Fig. 1 only in the arrangement of retracting springs. In this brake a spring 56 is provided with its opposite ends connected to the shoes 57 and 58 adjacent their free ends, for urging these shoes toward released position. A spring 59 is arranged with one end thereof connected to the shoe 58 adjacent its pivoted end, and with its opposite end connected to the shoe 60 adjacent its free end. This spring acts to urge the shoe 60 toward released position. Similarly, the shoe 61 is urged toward released position by the spring 62 which is arranged with one end thereof connected to the shoe 60 adjacent its pivoted end and with its other end connected to the shoe 61 adjacent its free end.

In addition to moving the shoes to released position the springs also act to take up lost motion and to prevent rattling of the parts.

I have found that in the operation of a brake of the type which I have shown in Fig. 1, the shoe 14 which is most remote from the actuating member may not move into operative engagement with the brake drum simultaneously with the next preceding shoe 13 when the actuating member is moved to apply the brake. Likewise the shoe 13 may not move into operative engagement with the brake drum simultaneously with the initial shoe 12. This tendency for the shoes 14 and 13 to lag behind the shoe 12 is caused by deflection or distortion of these shoes by the forces applied to the free ends of these shoes. In order that the more remote shoes may move into operative engagement with the brake drum simultaneously with, or at any desired rate in relation to the shoes adjacent the actuating member, I incline one or both of the opposed bearing surfaces provided on the overlapping portions of the shoes so as to accelerate or decelerate the movement of the more remote shoes as may be desired. In Fig. 6 of the drawings, I have shown the parts which transmit braking force from one shoe to an adjacent shoe, arranged and constructed so as to compensate for the deflection of the more remote shoes by causing the movement of these shoes to be accelerated. In this arrangement the arm 63 of the pivoted shoe 64 is overlapped by the free end 65 of another pivoted shoe 66 which is actuated by movement of the shoe 64. The arm 63 is formed with a surface 67 which is in opposed relation to the surface 68 formed on the shoe 66. A hardened bearing member 69 is seated on the surface 67, and a similar hardened bearing member 70 is seated on the surface 68. A roller 71 is arranged between the bearing members for cooperation with their opposed faces, and as thus far described this arrangement is similar to the bearing means provided between the overlapping portions of shoes 12 and 13, and between the overlapping portions of shoes 13 and 14, shown in Fig. 1.

To accelerate and increase the movement of shoe 66 and thus compensate for the deflection of this shoe so that it will move into operative engagement with the drum substantially simultaneously with the preceding shoe 64, I form the bearing member 70, with its face 72 which is engaged by the roller, inclined relative to the face 73 of the bearing member 69. Thus, in the arrangement illustrated in Fig. 6, the face 73 of bearing member 69 is perpendicular to the radial line 74, which passes through the center of the drum, while the face 72 of the bearing member 70 is inclined from a perpendicular to this line.

It is obvious that in producing acceleration or deceleration in the movement of the more remote shoes, one of the opposed bearing faces may be inclined, as shown in Fig. 6, or, if desired, both of these faces may be inclined and arranged in parallel relation as shown in Fig. 7. In the arrangement of Fig. 7 the opposed bearing surfaces 72' and 73' of the friction members 66' and 64' are substantially parallel to each other and are both inclined with respect to a radial line 74' which passes through the center of the drum and through the opposed surfaces.

While the multiple shoe brakes which I have shown, employ four shoes, it should be understood that this number may be changed to suit various conditions.

It will now be clearly understood that I have provided a brake in which braking force applied to one pivoted shoe is transmitted in an efficient manner to an adjacent pivoted shoe, and likewise, it will be readily understood that by my arrangement I have provided a brake in which the frictional loss between the moving parts is reduced to a minimum, whereby the life of the brake is materially lengthened, and the maximum braking force is attained with the least effort applied to the brake pedal or lever.

While I have shown and described my invention in a detailed manner it should be understood, however, that I do not intend to limit myself to the precise details shown and described, but regard my invention as including such changes and modifications as do not involve a departure from the spirit of the invention and the scope of the appended claims.

Having described my invention, I claim:

1. A brake comprising a drum, a supporting member adjacent said drum, a plurality of shoes pivotally mounted on said supporting member, each of said shoes being adapted and arranged for frictional engagement with said drum, and floating roller means disposed intermediate said shoes whereby braking force applied to one of said pivoted shoes is transmitted to another of said pivoted shoes.

2. A brake comprising a drum, a supporting member adjacent said drum, a plurality of shoes carried by said supporting member, each of said shoes being adapted and arranged for frictional engagement with said drum, and a roller interposed between portions of adjacent shoes whereby braking force applied to one of said shoes is transmitted to an adjacent shoe.

3. A brake comprising a drum, a supporting member adjacent said drum, a plurality of shoes pivotally mounted on said supporting member for engagement with said drum, and means whereby braking force applied to one of said shoes is transmitted to another of said shoes, said means comprising opposed bearing surfaces on adjacent shoes and roller means interposed between said bearing surfaces.

4. A brake comprising a drum, a supporting member adjacent said drum, a plurality of shoes carried by said member for engagement with said drum, said shoes being arranged with a portion of one shoe overlapping a portion of an adjacent shoe, bearing surfaces on said overlapping portions, and roller means interposed between said bearing surfaces whereby braking force is transmitted to said overlapping shoe.

5. A brake comprising a drum, a supporting member adjacent said drum, a shoe pivoted on said member for engagement with said drum, means for applying braking force to said shoe, a second shoe pivoted on said member for engagement with said drum, said shoes being arranged with portions thereof overlapping, and means comprising a floating roller disposed between the overlapping portions of said shoes whereby braking force is transmitted through said overlapping portions to said second shoe.

6. A brake comprising a drum, a supporting member adjacent said drum, a shoe pivoted on said supporting member for engagement with said drum, a bearing surface on the free end of said shoe, an actuating member having a rounded portion adapted to engage said surface for actuating said shoe, said parts being arranged so that the zone of contact between said portion and said surface is approximately bisected by a line extending parallel with a chord passing substantially through the axis of said cam and the center of the pivot for said shoe, said line being spaced from said chord a distance approximately equal to the radius of said rounded portion, whereby the contact between said portion and said surface will be substantially a rolling contact.

7. A brake comprising a drum, a supporting member adjacent said drum, a plurality of shoes pivotally mounted on said supporting member for engagement with said drum, and means for transmitting braking force from one of said shoes to another of said shoes, said means including opposed bearing surfaces on adjacent shoes, and friction reducing means interposed between said bearing surfaces, the plane of one of said bearing surfaces being inclined to the plane of the other of said bearing surfaces.

8. In a brake the combination of a rotatable drum, a shoe adapted to be moved into engagement with said drum, actuating means for applying force to said shoe, a second shoe adapted to be moved into engagement with said drum, and means for transmitting force to said second shoe including opposed bearing surfaces on said shoes, said bearing surfaces being arranged to cause the rate movement of said second shoe to be varied relative to the rate of movement of the first mentioned shoe.

9. A brake comprising a drum, a supporting member adjacent said drum, a plurality of shoes pivotally mounted on said supporting member for engagement with said drum, and means for transmitting braking force from one of said shoes to another of said shoes, said means including opposed bearing surfaces on adjacent shoes, and friction reducing means interposed between said bearing surfaces, one of said bearing surfaces being disposed in inclined relation with respect to a radial line passing through the center of said drum.

10. In a brake, the combination of a drum, a plurality of shoes arranged in a series extending circumferentially of said drum, each of said shoes having a portion for frictional cooperation with said drum and an arm in offset relation to the friction portion and extending substantially in the direction of said series, the shoes of said series being disposed with the friction portion of one shoe overlapping the offset arm of the next adjacent shoe, and a force transmitting roller disposed between the arm of one shoe and the overlapping friction portion of the next adjacent shoe.

11. In a brake, the combination of a drum, a support adjacent said drum, a plurality of shoes arranged in a series extending circumferentially of said drum, each of said shoes having a portion for frictional cooperation with said drum and an arm extending substantially in the direction of said series and pivoted to said support, the shoes of said series being disposed with the friction portion of one shoe overlapping the pivoted arm of the next adjacent shoe, and a force transmitting roller disposed between the pivoted arm of one shoe and the overlapping friction portion of the next adjacent shoe.

12. In a brake, the combination, of a drum, a support adjacent said drum, a plurality of shoes arranged in a series extending circumferentially of said drum, each of said shoes having a portion for frictional cooperation with said drum and an arm extending substantially in the direction of said series and pivoted to said support, the shoes of said series being disposed with the friction portion of one shoe overlapping the pivoted arm of the next adjacent shoe, and a floating force transmitting roller disposed between the pivoted arm of one shoe and the overlapping friction portion of the next adjacent shoe, said roller having engagement with the last mentioned arm intermediate the pivot thereof and the friction portion of said one shoe.

13. In braking apparatus, the combination of a rotatable drum, a pair of friction members for cooperation with said drum, said members being shiftable so as to have a component of movement circumferentially of the drum as they are brought from their released position into braking cooperation with the drum, means for applying pressure to one of said members, and means for transmitting pressure to the other of said members from said one member, the last mentioned means comprising bearing surfaces on said members in substantially opposed relation and an element in contact with said bearing surfaces and adapted to roll thereon.

14. In braking apparatus, the combination of a rotatable drum, a pair of friction members for cooperation with said drum, said members being pivoted for swinging movement so as to have a component of movement circumferentially of the drum as they are brought from their released position into braking cooperation with the drum, means for applying pressure to one of said members, and means for transmitting pressure to the other of said members from said one member, the last mentioned means comprising bearing surfaces on said members in substantially opposed relation and an element in contact with said bearing surfaces and adapted to roll thereon.

LYLE K. SNELL.